(12) United States Patent
Nikas

(10) Patent No.: US 8,850,709 B2
(45) Date of Patent: Oct. 7, 2014

(54) TRIMMER AND DOUBLE ACTING BLADE ASSEMBLIES FOR TRIMMERS

(71) Applicant: Alex Nikas, San Francisco, CA (US)

(72) Inventor: Alex Nikas, San Francisco, CA (US)

(*) Notice: Subject to any disclaimer, the term of this patent is extended or adjusted under 35 U.S.C. 154(b) by 7 days.

(21) Appl. No.: 13/892,109

(22) Filed: May 10, 2013

(65) Prior Publication Data

US 2013/0232796 A1  Sep. 12, 2013

Related U.S. Application Data

(63) Continuation-in-part of application No. 13/300,397, filed on Nov. 18, 2011.

(51) Int. Cl.
*B26B 19/02* (2006.01)

(52) U.S. Cl.
USPC ............................................ 30/43.92; 30/210

(58) Field of Classification Search
USPC ............................ 30/210, 43.9, 43.92; 83/694
See application file for complete search history.

(56) References Cited

U.S. PATENT DOCUMENTS

| | | | | |
|---|---|---|---|---|
| 155,855 A * | 10/1874 | Burgess | | 30/210 |
| 518,204 A * | 4/1894 | Bell | | 30/210 |
| 547,718 A * | 10/1895 | Fletcher | | 30/210 |
| 1,115,328 A * | 10/1914 | Murran | | 30/223 |
| 1,354,458 A * | 9/1920 | Riggs | | 30/197 |
| 1,875,125 A * | 8/1932 | Oster et al. | | 30/221 |
| 2,080,451 A * | 5/1937 | Wilcox | | 30/210 |
| 2,277,080 A * | 3/1942 | Davis | | 30/124 |
| 2,322,610 A * | 6/1943 | Wilcox | | 173/59 |
| 2,651,107 A * | 9/1953 | Bartlett | | 30/219 |
| 2,840,904 A * | 7/1958 | Hutchins | | 30/210 |
| 3,372,481 A * | 3/1968 | Skinner | | 30/210 |
| 3,970,912 A | 7/1976 | Hoffman | | |
| 4,619,045 A | 10/1986 | Mayer | | |
| 4,711,030 A | 12/1987 | Ruston et al. | | |
| D298,601 S | 11/1988 | Tsuji | | |
| 4,827,616 A | 5/1989 | Sistare | | |
| D348,184 S | 6/1994 | Neshat et al. | | |
| 5,402,576 A * | 4/1995 | Kiyooka et al. | | 30/216 |
| 5,412,873 A | 5/1995 | Gibson | | |
| 5,473,818 A * | 12/1995 | Otsuka et al. | | 30/43.9 |
| 5,640,837 A | 6/1997 | Ueyama | | |
| 6,098,288 A * | 8/2000 | Miyagawa et al. | | 30/43.91 |
| 6,276,060 B1 * | 8/2001 | Faulstich et al. | | 30/34.1 |
| D469,321 S | 1/2003 | Smith et al. | | |
| 7,251,896 B2 * | 8/2007 | Khubani | | 30/199 |
| 7,581,319 B1 * | 9/2009 | Little et al. | | 30/43.92 |
| 7,757,404 B2 * | 7/2010 | Ouchi et al. | | 30/43.91 |
| 8,176,637 B2 * | 5/2012 | Fukutani et al. | | 30/201 |
| D672,923 S * | 12/2012 | Loudenback et al. | | D30/158 |
| 2005/0262695 A1* | 12/2005 | Ouchi et al. | | 30/43.92 |
| 2007/0050991 A1* | 3/2007 | Mooney et al. | | 30/210 |
| 2010/0299930 A1* | 12/2010 | Voorhorst et al. | | 30/43.92 |

(Continued)

*Primary Examiner* — Sean Michalski
(74) *Attorney, Agent, or Firm* — Meyer IP Law Group

(57) ABSTRACT

In an embodiment, a pair of blades, one or both of which is adapted to be reciprocated along a longitudinal axis, comprises a first blade and a second blade, each blade having a cutting edge extending along a portion of the blade length. The cutting edge includes a series of teeth. A width of each blade is stepwise reduced along the cutting edge to the distal end so that one or more teeth from the series of teeth has a cutting surface that is receded relative to a tooth from the series of teeth that is closer to the proximal end. The teeth of the series of teeth are uniformly oriented relative to the longitudinal axis.

20 Claims, 15 Drawing Sheets

(56) References Cited

U.S. PATENT DOCUMENTS

| | | | |
|---|---|---|---|
| 2011/0005081 A1* | 1/2011 | Ouchi et al. | 30/43.92 |
| 2011/0010942 A1* | 1/2011 | Lau | 30/29.5 |
| 2012/0240409 A1* | 9/2012 | Inoue et al. | 30/43.92 |

* cited by examiner

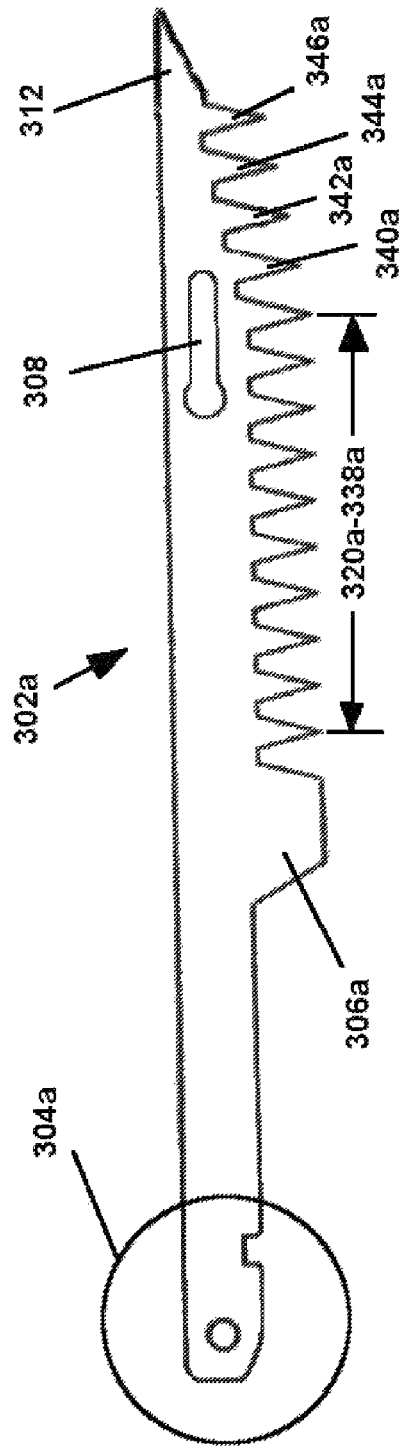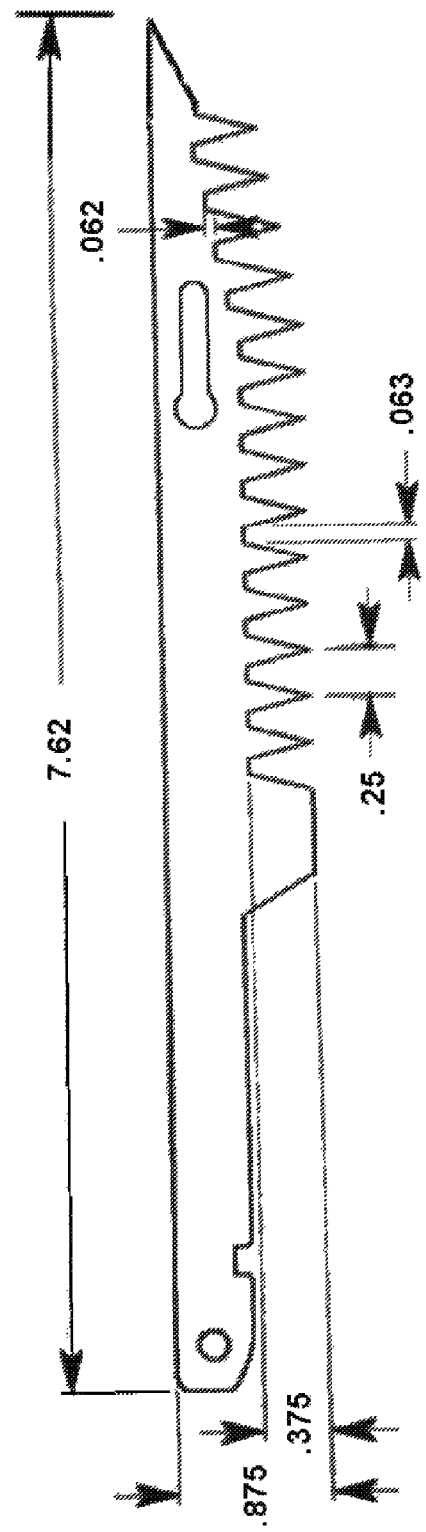
FIG. 4A
FIG. 4B

TRIMMER AND DOUBLE ACTING BLADE ASSEMBLIES FOR TRIMMERS

CLAIM OF PRIORITY

This Continuation-in-Part application claims the benefit of priority to U.S. patent application Ser. No. 13/300,397, titled "TRIMMER AND DOUBLE ACTING BLADE ASSEMBLIES FOR TRIMMERS", filed Nov. 18, 2011, which is herein incorporated by reference.

FIELD OF THE INVENTION

This invention relates to trimmers and double acting trimming blade assemblies.

BACKGROUND

Trimmers that utilize double acting blade assemblies rely on a scissoring action whereby a pair of cutting blades having laterally projecting teeth move back and forth in opposite directions. The opposing reciprocation of the blades alternatively creates and closes openings between teeth. Hedge trimmers, for example, capture leaves and branches within the openings which are then severed as the openings close, trimming the hedge.

Existing trimmers typically include uniformly shaped and arranged teeth extending from opposite edges of the blades. Such blades can be efficient for removing large amounts of material. However, high precision can be difficult to achieve and tight spaces may not be easily negotiable with such blades.

SUMMARY

Embodiments of the present invention are related to trimmers and pairs of blades for use with trimmers. In an embodiment, a pair of blades, one or both of which is adapted to be reciprocated along a longitudinal axis, comprises a first blade and a second blade, each blade having a proximal end, a distal end, a length extending between the proximal end and the distal end, and a cutting edge extending along a portion of the length to the distal end. The cutting edge of each blade includes a series of teeth. A width of each blade is stepwise reduced along the cutting edge to the distal end so that one or more teeth from the series of teeth has a cutting surface that is receded relative to a tooth from the series of teeth that is closer to the proximal end. The teeth of the series of teeth are uniformly oriented relative to the longitudinal axis. In a further embodiment, the teeth of the series of teeth of the first and second blade are generally uniform in size and shape. The teeth can be shaped as isosceles triangles, although in other embodiments the teeth can have some other shape.

BRIEF DESCRIPTION OF THE DRAWINGS

FIG. 4A is a side view of an alternative embodiment of a blade for use with embodiments of blade assemblies and trimmers in accordance with the present invention having an tooth for puncturing.

FIG. 4B illustrates exemplary dimensions for the blade of FIG. 4A.

DETAILED DESCRIPTION OF THE DRAWINGS

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. In addition, the first digit of a reference number identifies the embodiment in which the reference number first appears.

Figure 1:
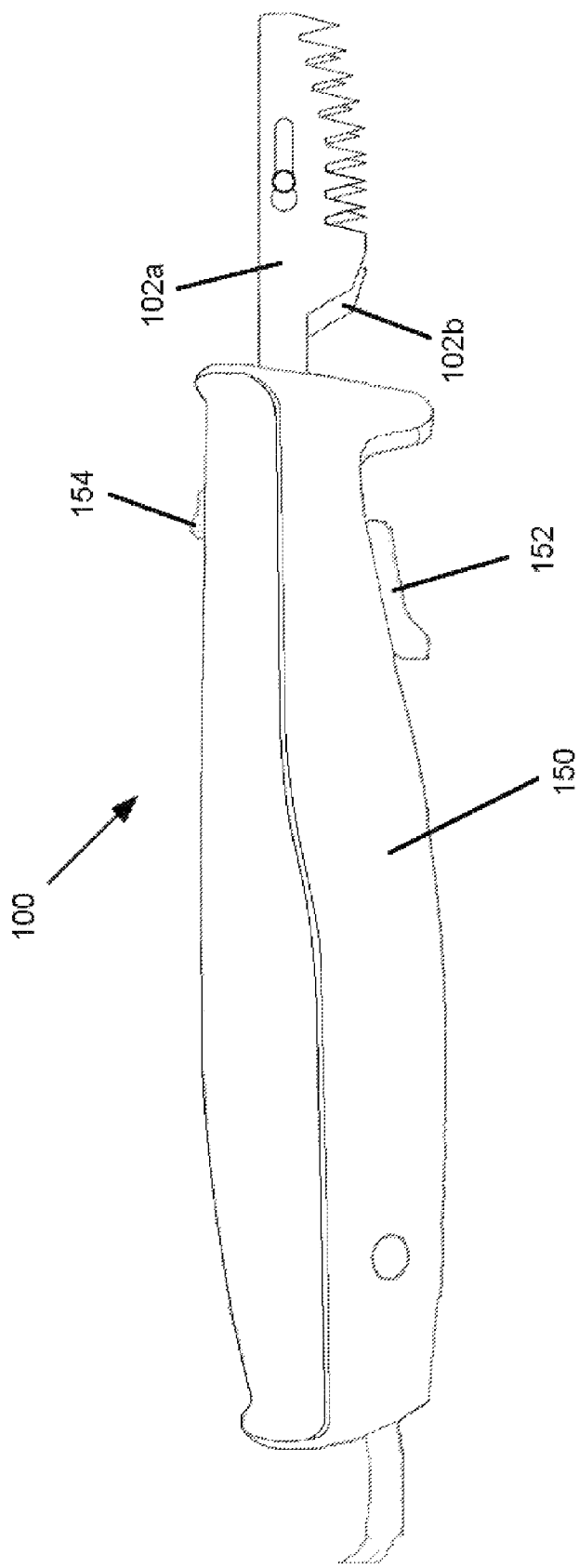
FIG. 1 is a side view of an embodiment of a trimmer in accordance with the present invention comprising a double acting blade assembly including a pair of blades each having a width that is stepwise reduced along the cutting edge.

FIG. 1 is a side view of an embodiment of a trimmer 100 in accordance with the present invention. A blade assembly 102 comprising a first blade 102a and a second blade 102b extends from a housing 150 of the trimmer 100. Within the housing 150 is a motor (not shown) that reciprocates the blades 102a, 102b back and forth relative to one another along an axis. A trigger 152 extends from the housing 150 and activates the motor when engaged. The motor can be deactivated by releasing the trigger. Alternatively, a rocker switch, slide switch, or any other activation mechanism can be used. In some embodiments, the reciprocation speed can be adjusted by a switch 154, or alternatively some other mechanism, such as a knob.

Figure 2A:
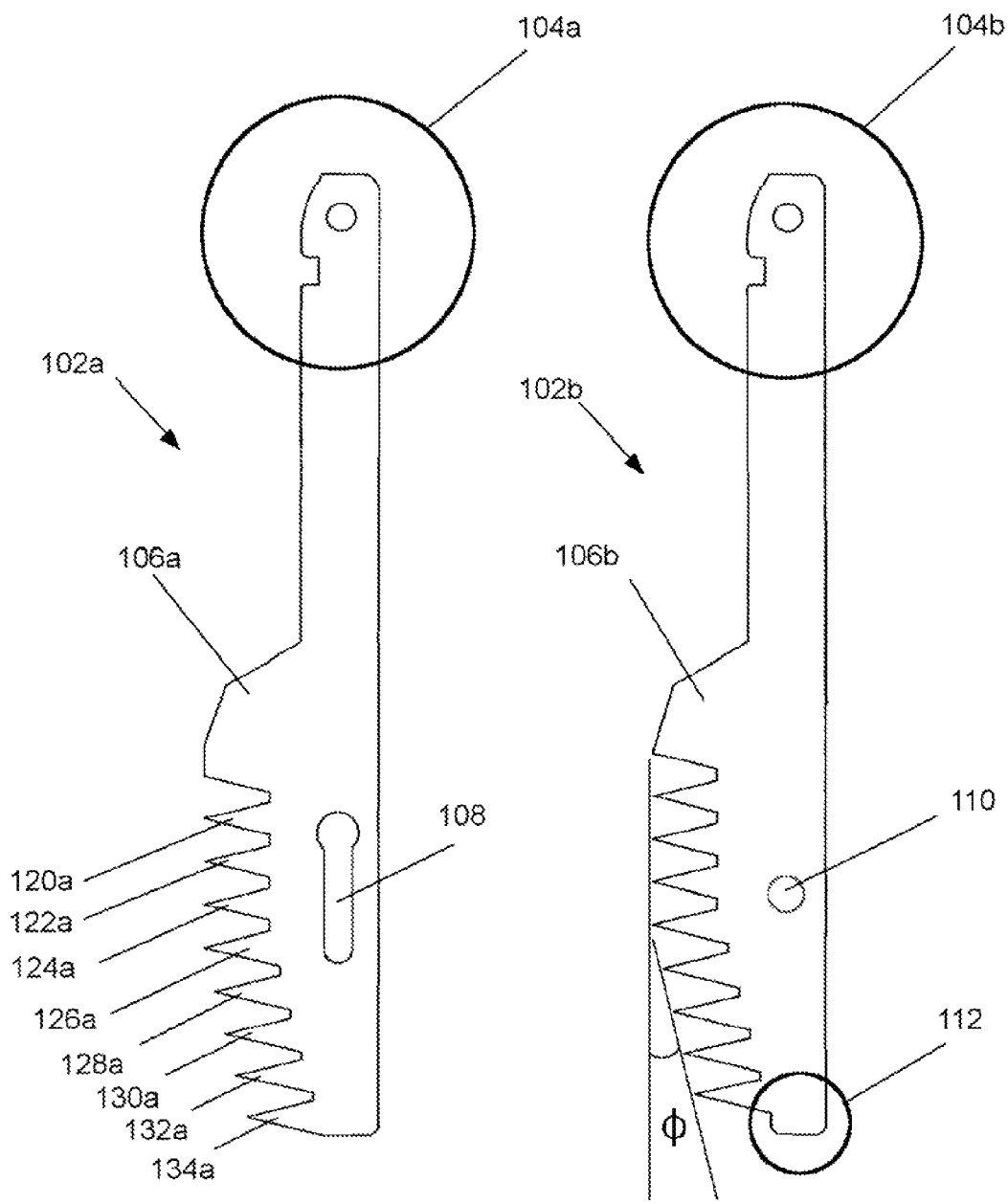
FIG. 2A is a side view of the double acting blade assembly used in the embodiment of FIG. 1.
Figure 2B:
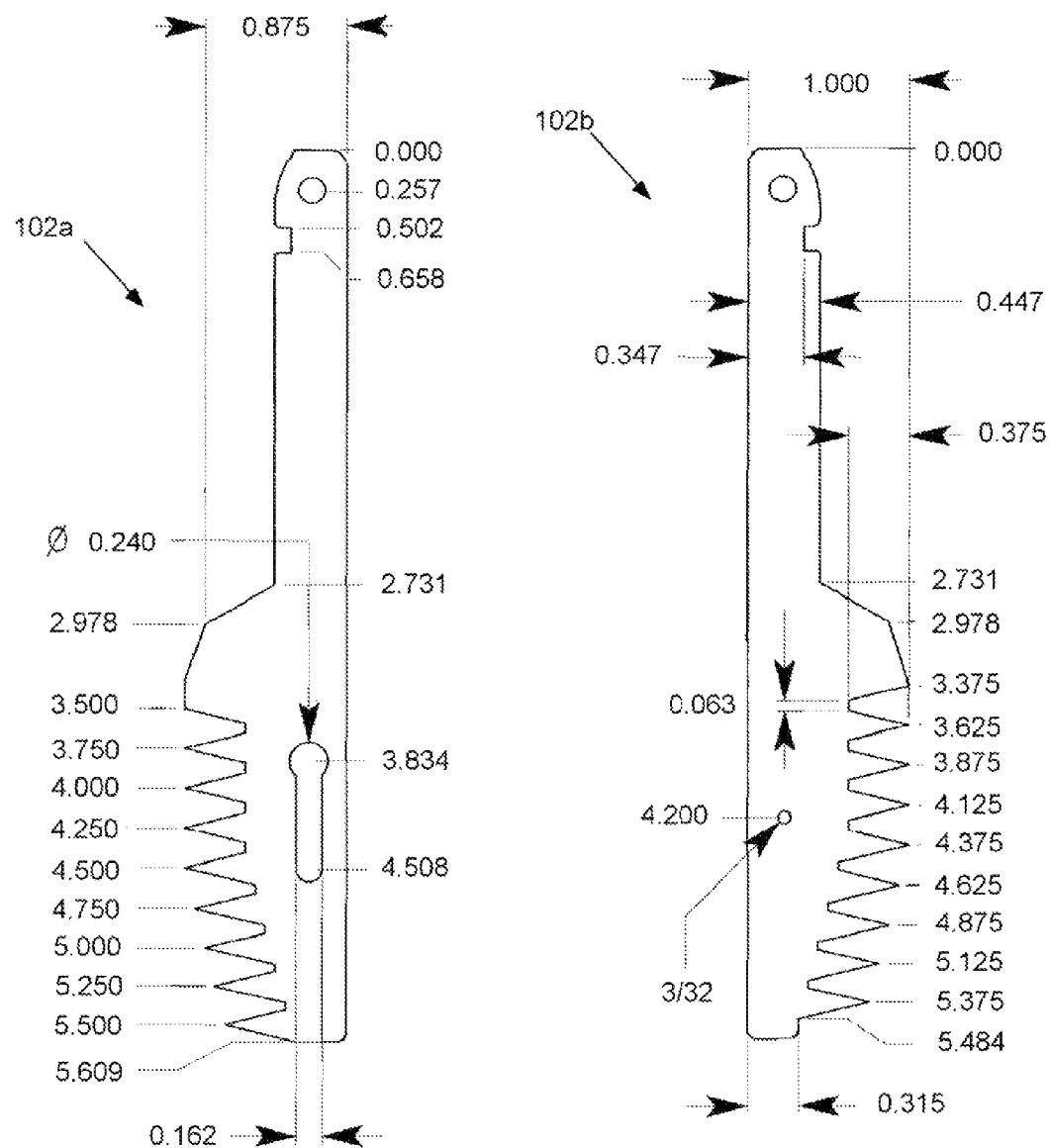
FIG. 2B illustrates exemplary dimensions for the double acting blade assembly of FIG. 2A.

FIGS. 2A and 2B are side views of an embodiment of a double acting blade assembly 102a, 102b usable with the trimmer 100 of FIG. 1. The first blade 102a and the second blade 102b each include a tang 104a, 104b at a proximal end. The tangs 104a, 104b include features (as shown, a notch and a hole) that mate with complementary features of the motor so that the blades 102a, 102b are rigidly held in place. The features need not necessarily be as shown in FIGS. 2A and 2B, but rather need only complement features of the motor that register the blades and hold the blades in place.

As shown, the first blade 102a and the second blade 102b extend from respective tangs 104a, 104b toward respective cutting edges with a generally uniform width. The cutting edges each begin at a kick 106a, 106b that flair the width of each blade 102a, 102b at one edge and not the opposite edge, which remains generally dull and does not perform any cutting. The kicks 106a, 106b are also generally dull and can help protect a hand holding the trimmer from the sharp edge of the most proximal tooth 120a of the cutting edge. The cutting edges of the first blade 102a and the second blade 102b are slightly offset, and the kick 106b of the second blade 102b is slightly smaller than the kick 106a of the first blade 102a. In other embodiments, the kicks 106a, 106b need not be shaped as shown. For example, the kicks can have an arcuate shape. In still other embodiments, the blades need not have kicks. In preferred embodiments, the width of the edge opposite the cutting edge does not flair out, so as to minify the overall width of the blade assembly. However, in other embodiments, the width of both edges can be increased. One of ordinary skill in the art, upon reflecting on the teachings contained herein, will appreciate the variety of shapes that the edges of the blades can The blades 102a, 102b of the blade assembly can be held in close proximity by a rivet-in-slot arrangement. As shown in FIGS. 2A and 2B, a rivet 110 extending from one of the blades 102a, 102b can be mated with a slot 108 formed in the other of the blades 102a, 102b, a portion of which is narrower than a head of the rivet 110. An enlarged opening in the distal end of the slot 108 is large enough to receive the rivet 110. The length of the slot 108 is such that when the rivet 110 is fitted into the slot 108 and the tangs 104a, 104b of the respective blades 102a, 102b are mated with the motor, the rivet 110 is moved far enough toward the distal end of the slot 108, that the rivet 110 is held within the narrower portion of the slot 108 during the entire travel distance of the blades 102a, 102b when they are reciprocated.

The cutting edges of the blade assembly are sized and shaped to improve cutting precision and an ability to negotiate confined or narrow spaces. As shown, the width of the first blade 102a is at a maximum along the first four teeth 120a-126a from a proximal end of the cutting edge. The widths of the first blade 102a is then stepwise reduced along the cutting edge to the distal end so that the next four teeth 128a-134a have cutting surfaces that are receded relative to the teeth that are closer to the proximal end of the cutting edge. The points of the first four teeth 120a-126a are aligned parallel to an axis formed along the length of the blade 102a, while the next four teeth 128-134a are aligned at an angle F to the axis. The teeth 120a-134a of the cutting edge are substantially the same size and shape, and are oriented perpendicular to the axis formed along the length of the blade 102a. As shown, the teeth 120a-134a are shaped as isosceles triangles, although in other embodiments the teeth can have some other shape. The cutting edge of the second blade 102b, and the size, shape, and arrangement of the teeth of the second blade 102b are substantially the same as the first blade 102a. However, a portion 112 of the second blades can extend slightly past the cutting edge so that the blade lengths are the same.

FIG. 2B illustrates exemplary dimensions for the blades 102a, 102b of FIG. 2A. The dimensions are given in inches and are provided merely as examples. The invention is in no way meant to be limited to the exemplary dimensions provided.

Figure 3A:
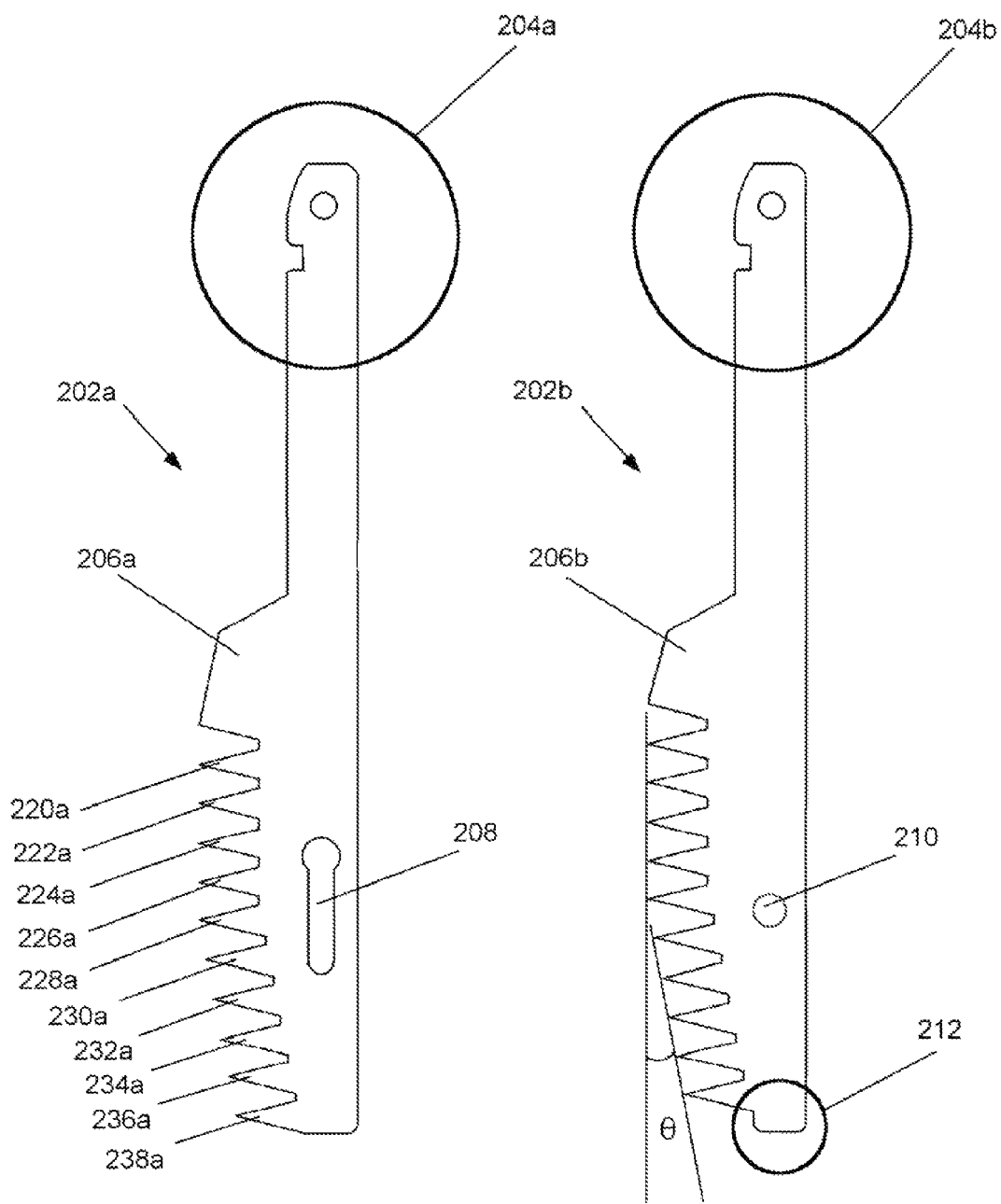
FIG. 3A is a side view of an alternative embodiment of a double acting blade assembly for use with embodiments of trimmers in accordance with the present invention.
Figure 3B:
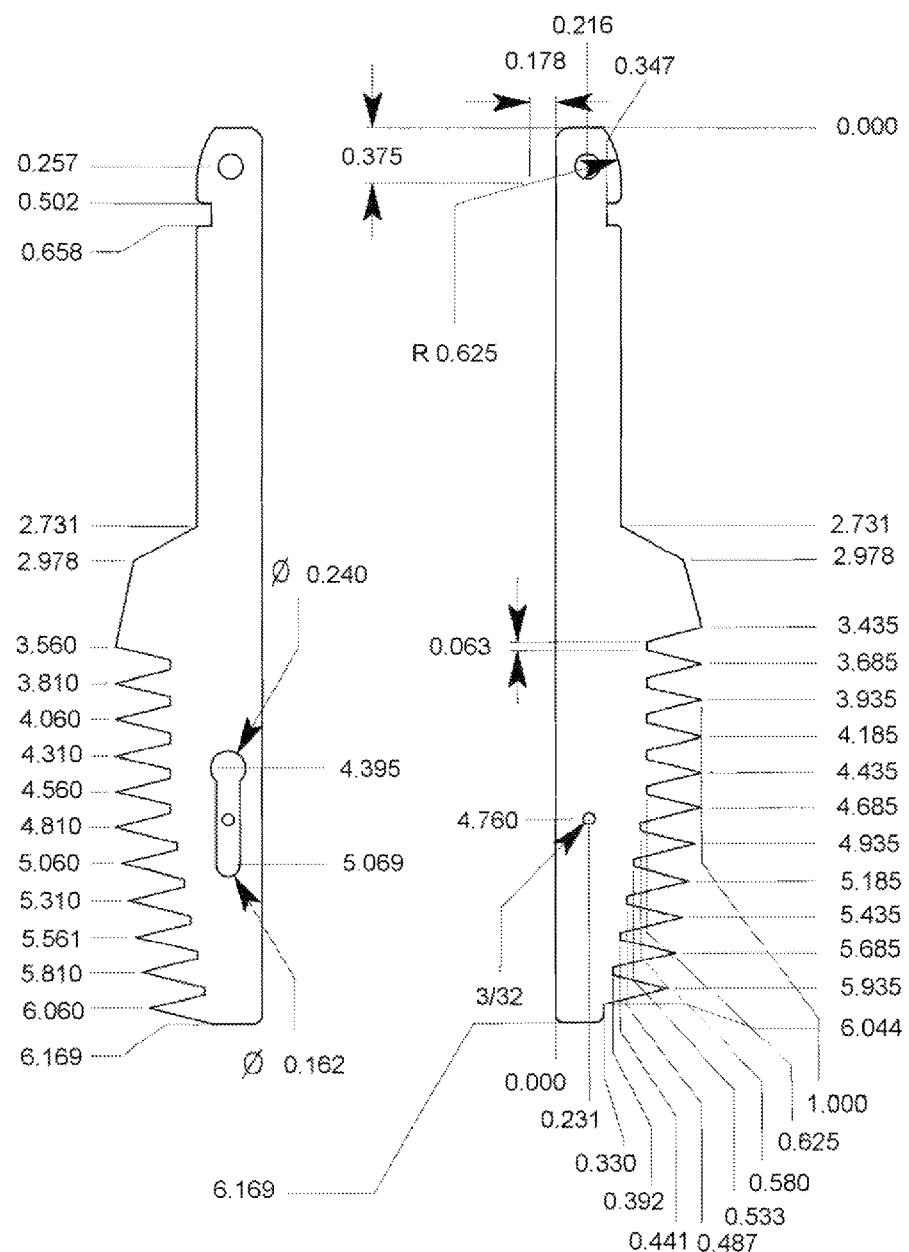
FIG. 3B illustrates exemplary dimensions for the double acting blade assembly of FIG. 3A.

FIGS. 3A and 3B are side views of an alternative embodiment of a double acting blade assembly 202a, 202b usable with the trimmer 100 of FIG. 1. As with the previous embodiment, the first blade 202a and the second blade 202b each include a tang 204a, 204b at a proximal end. The first blade 202a and the second blade 202b extend from respective tangs 204a, 204b toward respective cutting edges with a generally uniform width. The cutting edges each begin at a kick 206a, 206b that flair the width of each blade 202a, 202b at one edge and not the opposite edge, which remains generally dull and does not perform any cutting. As in the previous embodiment, the blades 202a, 202b of the blade assembly can be held in close proximity by a rivet-in-slot arrangement. As shown in FIGS. 3A and 3B, a rivet 210 extending from one of the blades 202a, 202b can be mated with a slot 208 formed in the other of the blades 202a, 202b.

The cutting edges of the blade assembly are longer than the cutting edges of the previous embodiment, and include more teeth. As shown, the width of the first blade 202a is at a maximum along the first five teeth 220a-228a from a proximal end of the cutting edge. The widths of the first blade 202a is then stepwise reduced along the cutting edge to the distal end so that the next five teeth 230a-238a have cutting surfaces that are receded relative to the teeth that are closer to the proximal end of the cutting edge. The points of the first five teeth 220a-228a are aligned parallel to an axis formed along the length of the blade 202a, while the next five teeth 230-238a are aligned at an angle Q to the axis. The teeth 220a-238a of the cutting edge are substantially the same size and shape, and are oriented perpendicular to the axis formed along the length of the blade 202a. As shown, the teeth 220a-238a are shaped as isosceles triangles, although in other embodiments the teeth can have some other shape. The cutting edge of the second blade 202b, and the size, shape, and arrangement of the teeth of the second blade 202b are substantially the same as the first blade 202a. A portion 212 of the second blades can extend slightly past the cutting edge so that the blade lengths are the same.

FIG. 3B illustrates exemplary dimensions for the blades 202a, 202b of FIG. 3A. The dimensions are given in inches and are provided merely as examples. The invention is in no way meant to be limited to the exemplary dimensions provided.

FIGS. 4A and 4B are side views of an alternative embodiment of a single blade 302a of a dual acting blade assembly usable with the trimmer 100 of FIG. 1. As with the previous embodiments, the blade 302a includes a tang 304a at a proximal end. The blade 302a extends from the tang 304a toward a cutting edge with a generally uniform width. The cutting edges each begin at a kick 206a, 206b that flair the width of each blade 102a, 102b at one edge and not the opposite edge, which remains generally dull and does not perform any cutting. As in the previous embodiments, the blade 302a can be movably mated with a second blade to form the blade assembly with a rivet-in-slot arrangement.

The cutting edge of the blade is longer than the cutting edges of the previous embodiments, and includes more teeth with different numbers of receded and aligned teeth. As shown, the width of the blade 302a is at a maximum along the first ten teeth 320a-338a from a proximal end of the cutting edge. The widths of the blade 302a is then stepwise reduced along the cutting edge to the distal end so that the next four teeth 340a-346a have cutting surfaces that are receded relative to the teeth that are closer to the proximal end of the cutting edge. The points of the first ten teeth 320a-338a are aligned parallel to an axis formed along the length of the blade 302a, while the next four teeth 340-346a are aligned at an angle to the axis. The teeth 320a-346a of the cutting edge are substantially the same size and shape, and are oriented perpendicular to the axis formed along the length of the blade 302a. As shown, the teeth 320a-346a are shaped as isosceles triangles, although in other embodiments the teeth can have some other shape.

In addition to the fourteen teeth along the cutting edge, the blade 302a further includes a puncturing tooth 312 extending perpendicular to the axis of the blade 302a, the puncturing tooth 312 having the shape of a right triangle.

FIG. 4B illustrates exemplary dimensions for the blades 202a, 202b of FIG. 4A. The dimensions are given in inches and are provided merely as examples. The invention is in no way meant to be limited to the exemplary dimensions provided.

Figure 5A:
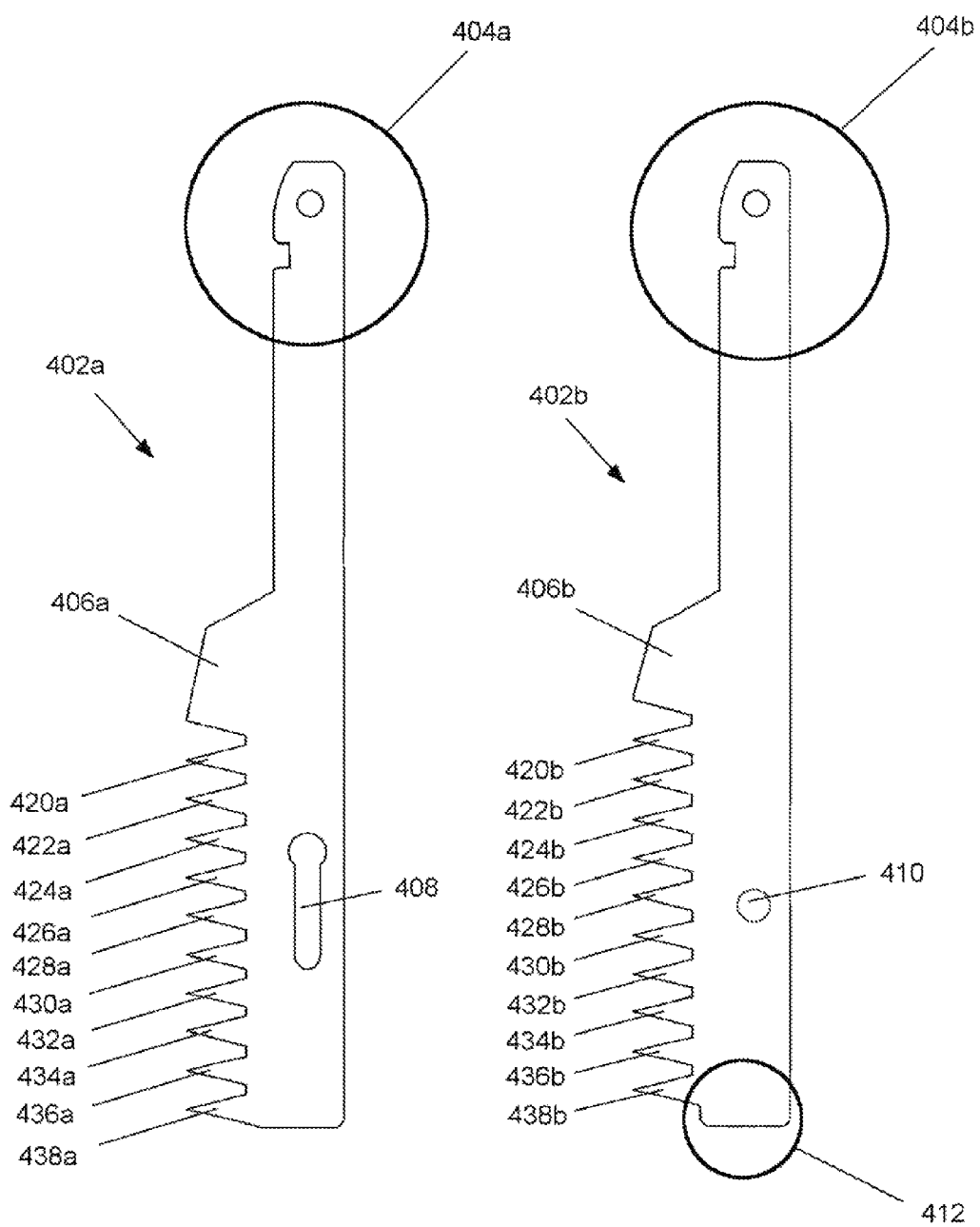
FIG. 5A is a side view of an alternative embodiment of a double acting blade assembly for use with embodiments of trimmers in accordance with the present invention.
Figure 5B:
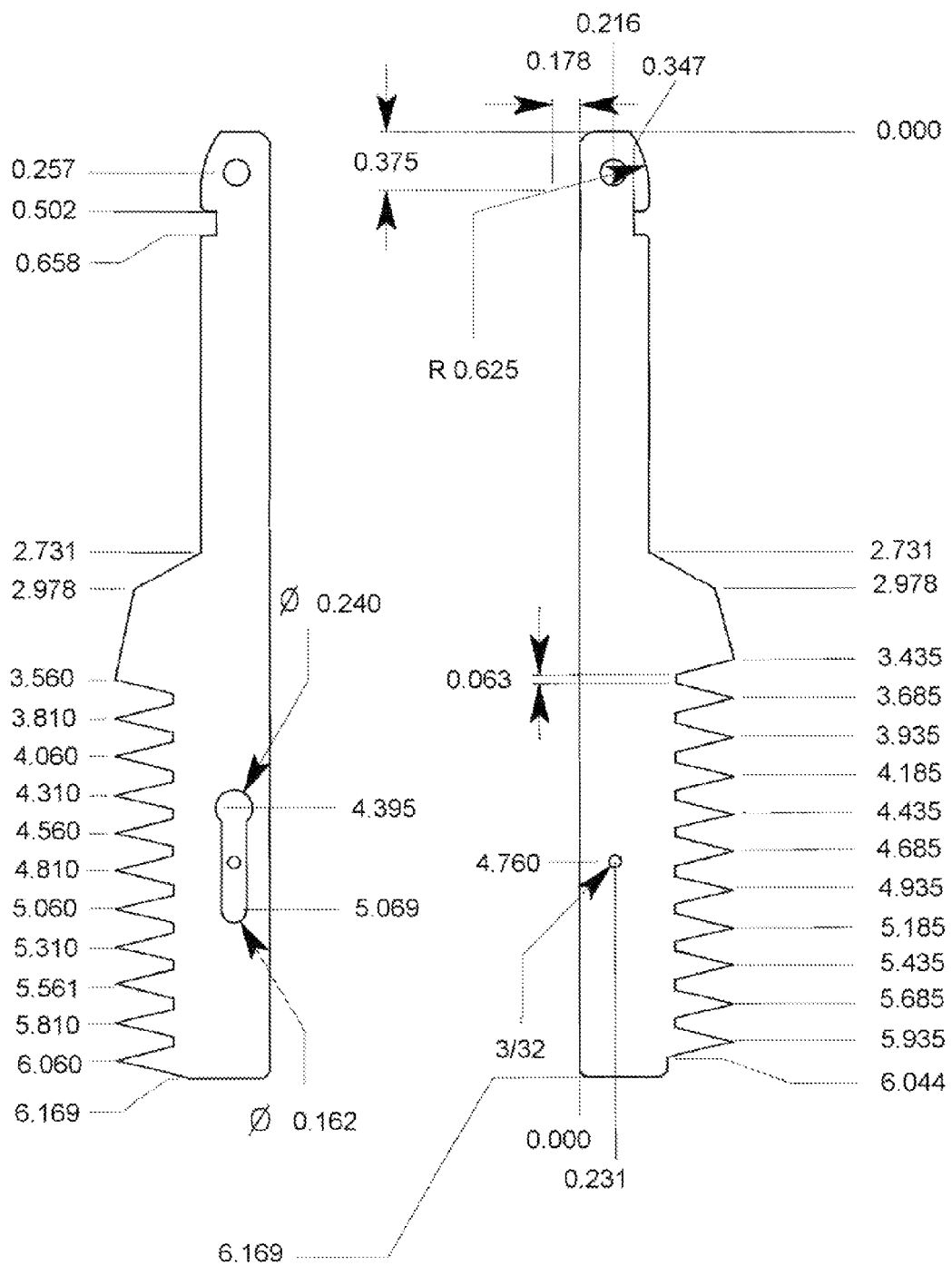
FIG. 5B illustrates exemplary dimensions for the double acting blade assembly of FIG. 5A.

Although in preferred embodiments, the cutting edge includes a width that is stepwise reduced with receded teeth; in other embodiments all of the teeth can be aligned. FIGS. 5A and 5B are side views of an alternative embodiment of a double acting blade assembly 402a, 402b usable with the trimmer 100 of FIG. 1. As with the previous embodiment, the first blade 402a and the second blade 402b each include a tang 404a, 404b at a proximal end. The first blade 402a and the second blade 402b extend from respective tangs 404a, 404b toward respective cutting edges with a generally uniform width. The cutting edges each begin at a kick 406a, 406b that flair the width of each blade 402a, 402b at one edge and not the opposite edge, which remains generally dull and does not perform any cutting. As in the previous embodiment, the blades 402a, 402b of the blade assembly can be held in close proximity by a rivet-in-slot arrangement. As shown in FIGS. 5A and 5B, a rivet 410 extending from one of the blades 402a, 402b can be mated with a slot 408 formed in the other of the blades 402a, 402b The cutting edges of the blade assembly include ten teeth 420a-438a, 420b-438b. The points of the teeth 420a-438a, 420b-438b are aligned parallel to an axis formed along the length of the respective blades 402a, 402b. The teeth 420a-438a, 420b-438b of the cutting edge are substantially the same size and shape, and are oriented perpendicular to the axis formed along the length of the respective blades 402a, 402b. As shown, the teeth 420a-438a, 420b-438b are shaped as isosceles triangles, although in other embodiments the teeth can have some other shape. A portion 412 of the second blades can extend slightly past the cutting edge so that the blade lengths are the same.

FIG. 5B illustrates exemplary dimensions for the blades 402a, 402b of FIG. 5A. The dimensions are given in inches and are provided merely as examples. The invention is in no way meant to be limited to the exemplary dimensions provided.

Figure 6A:
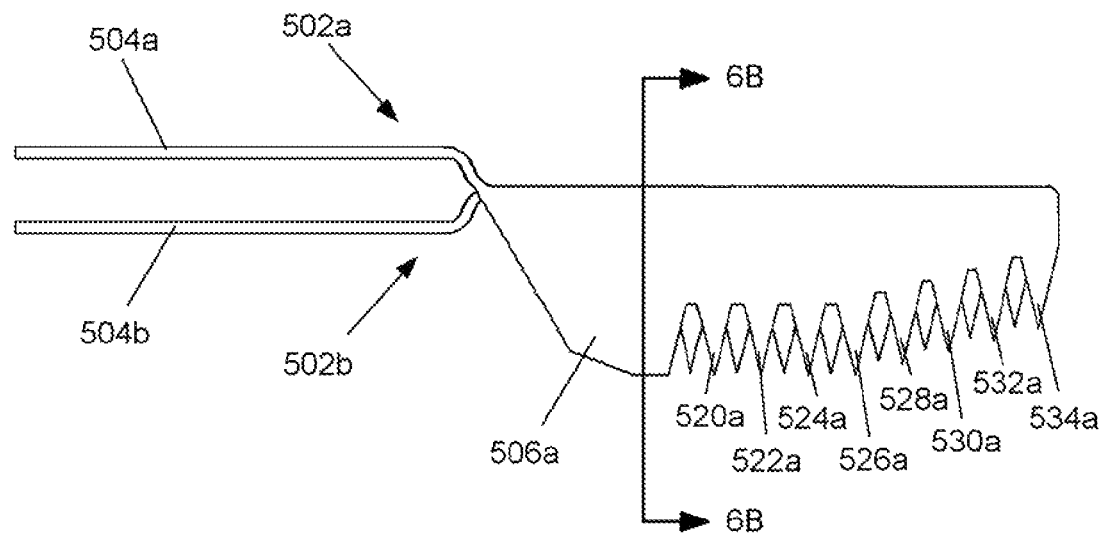
FIG. 6A is a top view of a further embodiment of a double acting blade assembly having two cutting edges arranged perpendicular to each other.
Figure 6B:
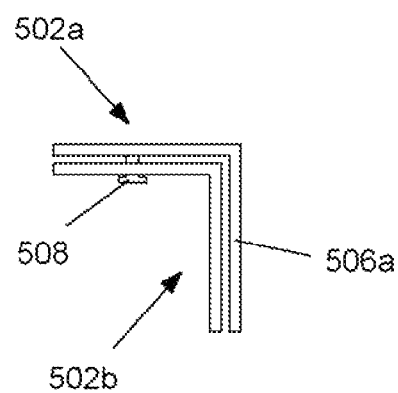
FIG. 6B is a cross-section of the double acting blade of assembly of FIG. 6A viewed toward the distal end of the blade assembly.

FIG. 6A is a top view and FIG. 6B is a cross-section view of a further embodiment of a double acting blade assembly 502a, 502b usable with the trimmer 100 of FIG. 1. The first and second blades 502a, 502b are shown mated, with the rivet 508 of one arranged within the slot 510 of the other. As with previous embodiments, the first blade 502a and the second blade 502b each include a tang 504a, 504b at a proximal end. The first blade 502a and the second blade 502b extend from respective tangs 504a, 504b toward respective cutting edges with a generally uniform width. The cutting edges each begin at a kick 506a that flair the width of each blade 502a, 502b at one edge and not the opposite edge, which remains generally dull and does not perform any cutting. However, unlike previous embodiment, the blade assembly 502a, 502b includes another set of cutting edges that extend perpendicular to the first cutting edges so that the two sets of cutting edges are joined at their opposite edges. In other embodiments, the cutting edges can form some other angle, whether obtuse or acute. The width of one of the blades 502a, 502b is slightly reduced so that so that the blades 502a, 502b can be nested.

The sets of cutting edges of the blade assembly each resemble the cutting edges from the embodiment of FIGS. 2A and 2B. As shown, the width of the first blade 502a is at a maximum along the first four teeth 520a-526a from a proximal end of the cutting edge. The widths of the first blade 502a is then stepwise reduced along the cutting edge to the distal end so that the next four teeth 528a-534a have cutting surfaces that are receded relative to the teeth that are closer to the proximal end of the cutting edge. The points of the first four teeth 520a-526a are aligned parallel to an axis formed along the length of the blade 502a, while the next four teeth 528-534a are aligned at an angle to the axis. The teeth 520a-534a of the cutting edge are substantially the same size and shape, and are oriented perpendicular to the axis formed along the length of the blade 502a. As with previous embodiments, the teeth 520a-534a are shaped as isosceles triangles, although in other embodiments the teeth can have some other shape. The cutting edge of the second blade 502b, and the size, shape, and arrangement of the teeth of the second blade 502b are substantially the same as the first blade 502a.

Figure 7A:
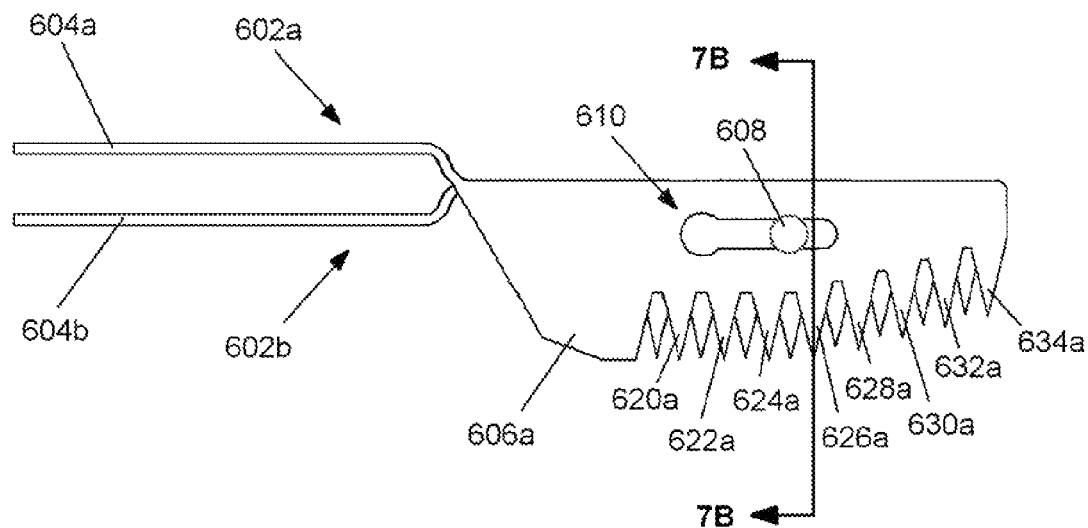
FIG. 7A is a top view of a further embodiment of a double acting blade assembly having a single cutting edge arranged perpendicular to a tang of the blade assembly.
Figure 7B:
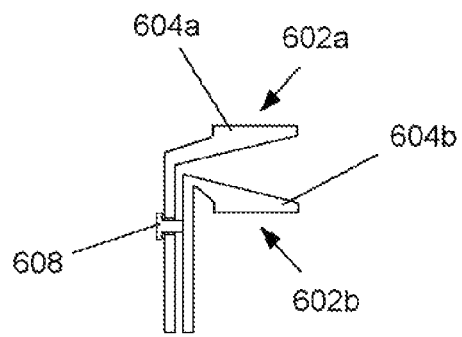
FIG. 7B is a cross-section of the double acting blade of assembly of FIG. 7A viewed toward the proximal end of the blade assembly.

FIG. 7A is a top view and FIG. 7B is a cross-section view of a further embodiment of a double acting blade assembly 602a, 602b usable with the trimmer 100 of FIG. 1. The first and second blades 602a, 602b are shown mated, with the rivet 608 of one arranged within the slot 610 of the other. As with previous embodiments, the first blade 602a and the second blade 602b each include a tang 604a, 604b at a proximal end. The first blade 602a and the second blade 602b extend from respective tangs 604a, 604b toward respective cutting edges with a generally uniform width. The cutting edges each begin at a kick 606a, the point at which the cutting edge extends perpendicular to the portion of the blade proximal of the kick 606a. The cutting edge extends from one edge of each blade 602a, 602b and not the opposite edge, which remains generally dull and does not perform any cutting. The width of one of the blades 602a, 602b is slightly reduced so that so that the blades 602a, 602b do not interfere with each other.

The sets of cutting edges of the blade assembly each resemble the cutting edges from the embodiment of FIGS. 2A and 2B. As shown, the width of the first blade 602a is at a maximum along the first four teeth 620a-626a from a proximal end of the cutting edge. The widths of the first blade 602a is then stepwise reduced along the cutting edge to the distal end so that the next four teeth 628a-634a have cutting surfaces that are receded relative to the teeth that are closer to the proximal end of the cutting edge. The points of the first four teeth 620a-626a are aligned parallel to an axis formed along the length of the blade 602a, while the next four teeth 628-634a are aligned at an angle to the axis. The teeth 620a-634a of the cutting edge are substantially the same size and shape, and are oriented perpendicular to the axis formed along the length of the blade 602a. As with previous embodiments, the teeth 620a-634a are shaped as isosceles triangles, although in other embodiments the teeth can have some other shape. The cutting edge of the second blade 602b, and the size, shape, and arrangement of the teeth of the second blade 602b are substantially the same as the first blade 602a.

Figures 8A, 8B:
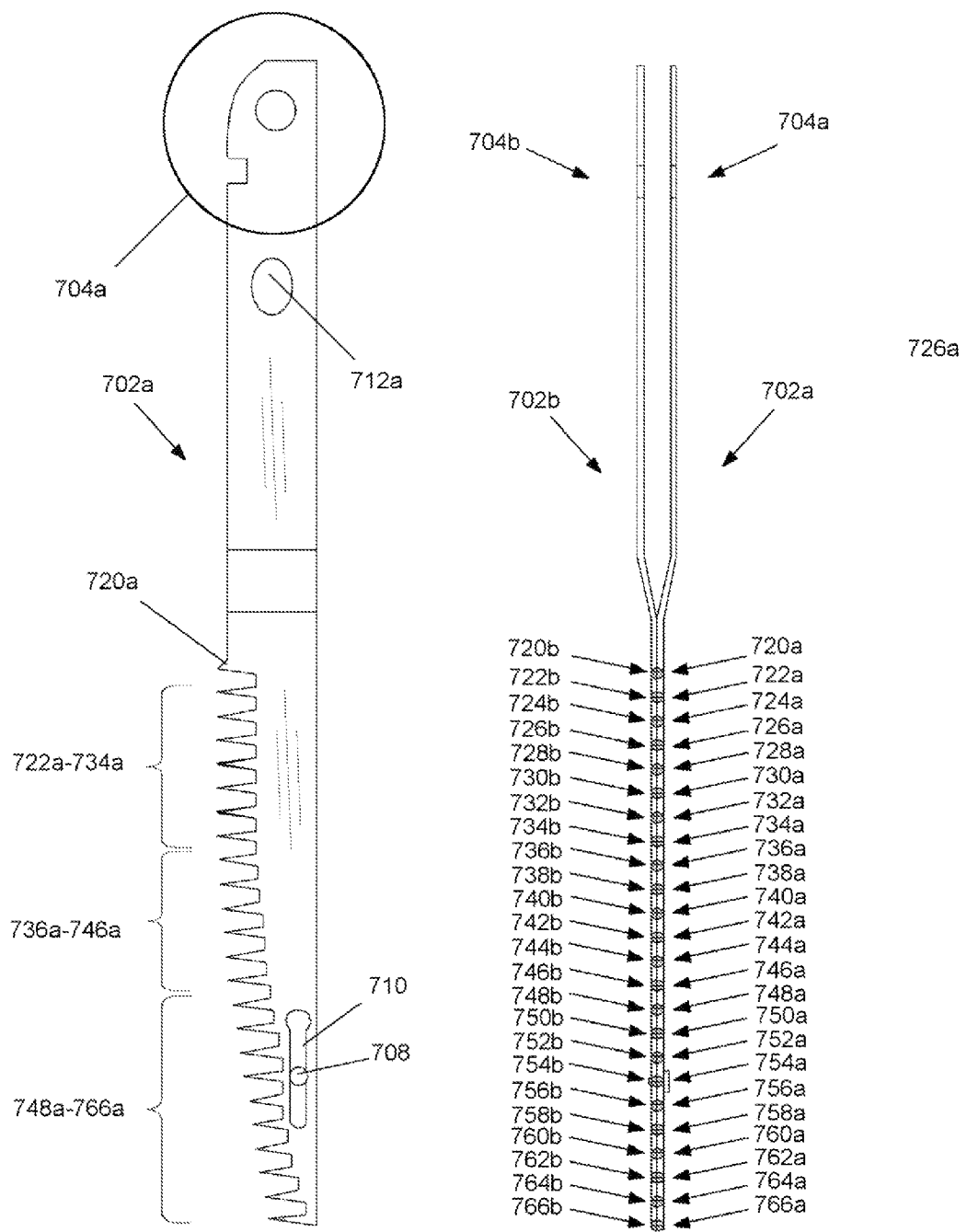
FIG. 8A is a side view of an alternative embodiment of a double acting blade assembly for use with embodiments of trimmers in accordance with the present invention.
FIG. 8B is a bottom view of the embodiment of FIG. 8A.

FIG. 8A is a side view and FIG. 8B is a bottom view of an alternative embodiment of a double acting blade assembly 702a, 702b usable with the trimmer 100 of FIG. 1. As with previous embodiments, the first blade 702a and the second blade 702b each include a tang 704a, 704b at a proximal end. As shown, the tangs 704a include a latching point 712a specific to one type of reciprocating motor, and which in other embodiments is not present, and therefore not described in subsequent embodiments. The first blade 702a and the second blade 702b extend from respective tangs 704a, 704b toward respective cutting edges with a generally uniform width. The blades 702a, 702b are longer and narrower than previous embodiments and have a streamlined shape allowing the blades to be inserted into confined spots, for example around a hedge or other plant, without disrupting surrounding foliage. As can be seen particularly in FIG. 8B, each of the blades 702a, 702b are bent or curved so that when the blades are assembled and a rivet 710 of the second blade 702b is fitted within a slot 708 of the first blade 702a, the tangs 704a, 704b of the blades are arrangeable on opposite sides of a motor that actuates one or both of the blades 702a, 702b.

As noted, cutting edges of the blade assembly are longer than the cutting edges of the previous embodiments, and include more teeth. Unlike previous embodiments, the cutting edge of the first blade 702a begins with a partial tooth 720a rather than with a kick that flairs the width of the blade. The partial tooth 720a can be dull or sharp, or one edge can be dull (the edge at a proximal end of the cutting edge) and the other edge can be sharp.

As shown, the width of the first blade 702a is at a maximum along the first eight teeth 720a-734a from a proximal end of the cutting edge. The width of the first blade 702a is then stepwise reduced along the cutting edge at a first angle so that the next six teeth 736a-746a have cutting surfaces that are receded relative to the teeth that are closer to the proximal end of the cutting edge, and then stepwise reduced along the cutting edge at a second, steeper angle to the distal end so that the next ten teeth 748a-766a have cutting surfaces that are receded relative to the teeth that are closer to the proximal end of the cutting edge. The teeth 722a-754a along most of the length of the cutting edge are approximately the same size and shape and are oriented perpendicular to the axis formed along the length of the first blade 702a. However, several teeth 756a-764a near the distal end of the cutting edge are slightly shorter in length.

As shown, the spacing of the teeth 720a-766a along the cutting edge is 0.12 inches from point-to-point, which has been discovered by the inventor to be well suited to precision manicuring of dryer, more brittle foliage. However, the inventor has further observed and appreciated that the point-to-point spacing of the teeth can vary, and a range of approximately 0.06 inches to 0.12 inches is generally well suited for precision manicuring foliage with relatively dry blades. As shown, the teeth 720a-766a are shaped as isosceles triangles, although in other embodiments the teeth can have some other shape. The cutting edge of the second blade 702b, and the size, shape, and arrangement of the teeth 720b-766b of the second blade 702b are substantially the same as the first blade 702a. When the proximal ends of the blades 702a, 702b are aligned, the teeth of the blades 702a, 702b are likewise aligned, as can be seen in FIG. 8B. The teeth 720a-766a, 720b-766b are also shorter relative to the teeth of previous embodiments, allowing the blades 702a, 702b to be arranged closer to the target plant and reducing or eliminating damage to surrounding foliage.

Figure 9A:
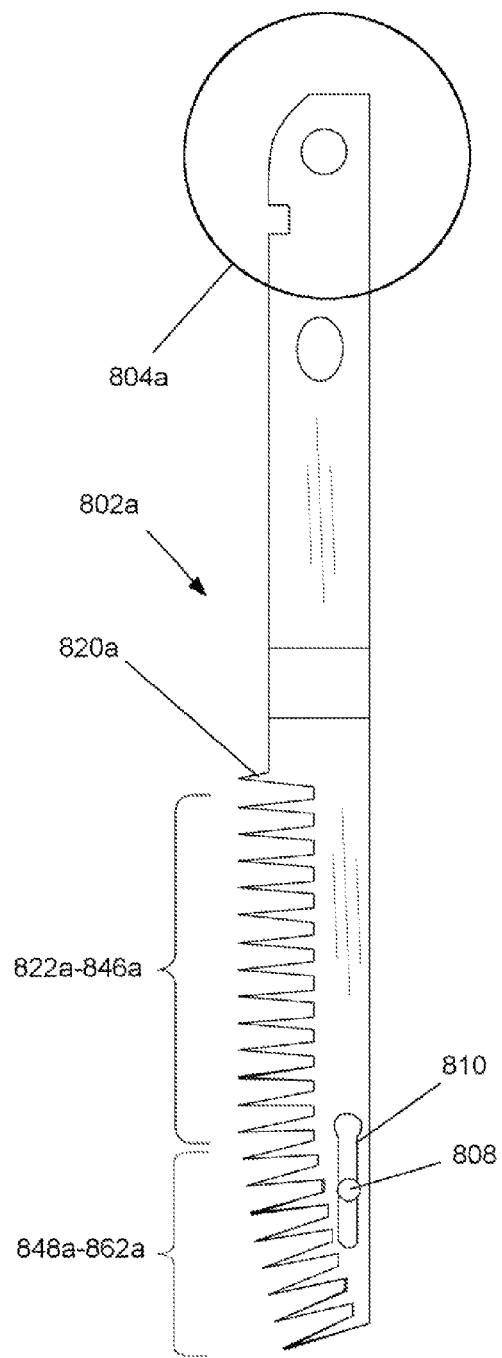
FIG. 9A is a side view of an alternative embodiment of a double acting blade assembly for use with embodiments of trimmers in accordance with the present invention.
Figure 9B:
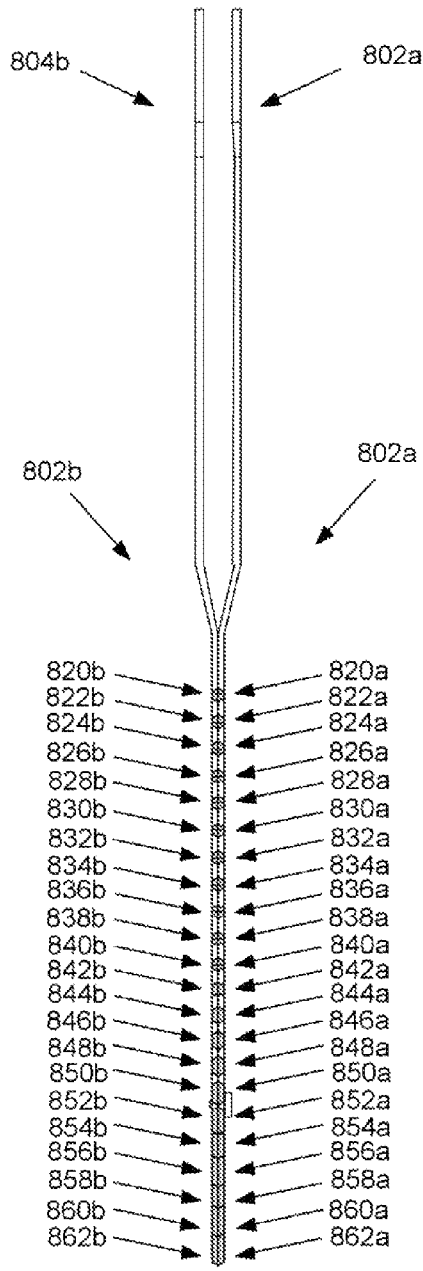
FIG. 9B is a bottom view of the embodiment of FIG. 9A.

FIG. 9A is a side view and FIG. 9B is a bottom view of an alternative embodiment of a double acting blade assembly 802a, 802b usable with the trimmer 100 of FIG. 1. As with previous embodiments, the first blade 802a and the second blade 802b each include a tang 804a, 804b at a proximal end. The first blade 802a and the second blade 802b extend from respective tangs 804a, 804b toward respective cutting edges with a generally uniform width. As can be seen particularly in FIG. 9B, each of the blades 802a, 802b are bent or curved so that when the blades are assembled and a rivet 810 of the second blade 802b is fitted within a slot 808 of the first blade 802a, the tangs 804a, 804b of the blades are arrangeable on opposite sides of a motor that actuates one or both of the blades 802a, 802b.

As with the embodiment of FIGS. 8A and 8B, a cutting edge of the first blade 802a begins with a partial tooth 820a, rather than with a kick that flairs the width of the blade. The partial tooth 820a can be dull or sharp, or one edge can be dull (the edge at a proximal end of the cutting edge) and the other edge can be sharp. As shown, the width of the first blade 802a is at a maximum along the first fourteen teeth 820a-846a from a proximal end of the cutting edge. The width of the first blade 802a is then stepwise reduced along the cutting edge at an angle so that the next six teeth 848a-862a have cutting surfaces that are receded relative to the teeth that are closer to the proximal end of the cutting edge. The spacing of the teeth 820a-862a of the first blade 802a is substantially the same as the spacing of the teeth of the embodiment shown in FIGS. 8A and 8B and has likewise been discovered by the inventor to be well suited to precision manicuring of dryer, more brittle plants. However, the teeth 820a-862a are slightly longer as compared with the teeth of FIGS. 8A and 8B. It has been discovered by the inventor that the longer teeth 820a-862a have an advantage in manicuring plants that are less dense in growth, allowing for more accurate trimming on singular shoots.

Still further, the orientation of at least ten of the teeth 842a-862a extending to the distal end is incrementally angled toward the distal end of the first blade 842a relative to preceding teeth. The incremental angling can be even or vary. The inventor has discovered that the incrementally angled teeth can be used to advantage in removing small portions of a plant while leaving the surrounding area untouched. The cutting edge of the second blade 802b, and the size, shape, rotation, and arrangement of the teeth 820b-862b of the second blade 802b are substantially the same as the first blade 802a. When the proximal ends of the blades 802a, 802b are aligned, the teeth of the blades 802a, 802b are likewise aligned, as can be seen in FIG. 9B.

Figure 10A:
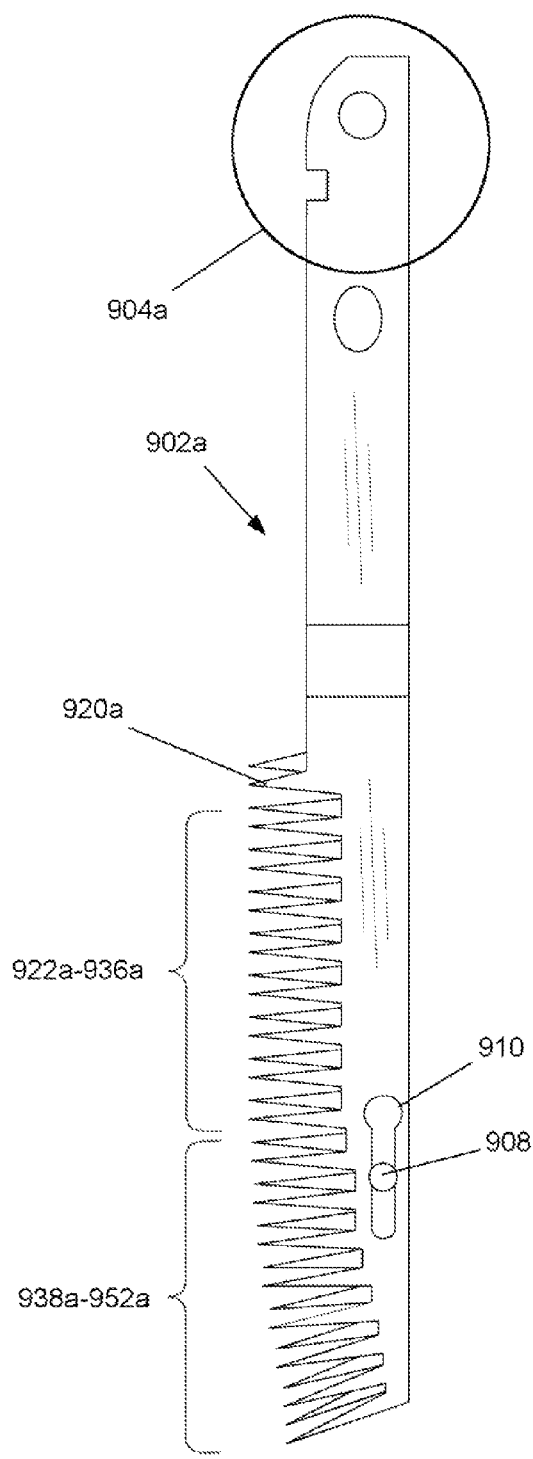
FIG. 10A is a side view of an alternative embodiment of a double acting blade assembly for use with embodiments of trimmers in accordance with the present invention.
Figure 10B:
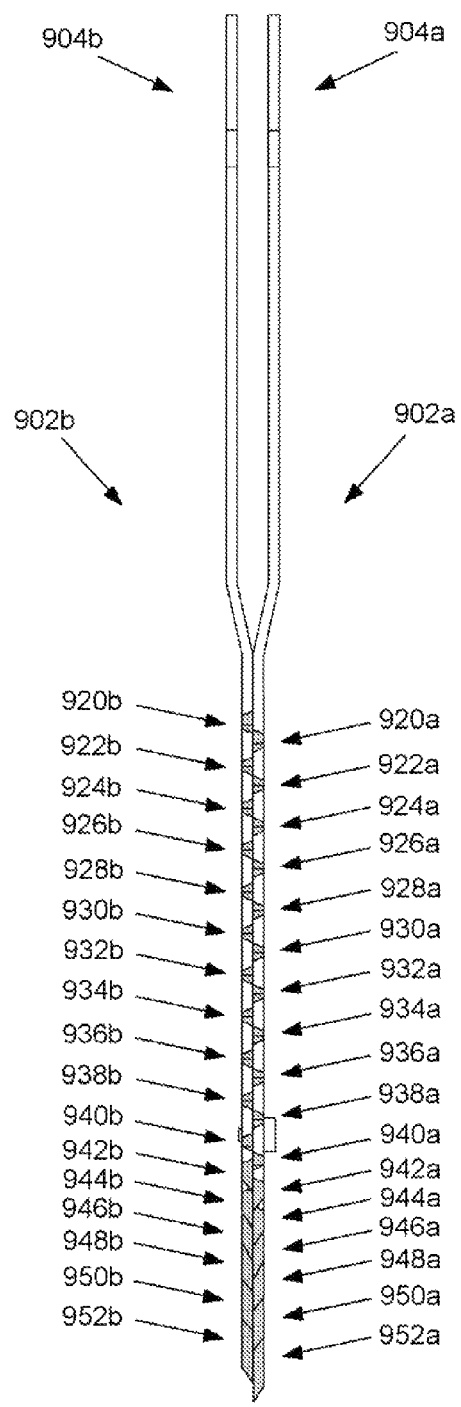
FIG. 10B is a bottom view of the embodiment of FIG. 10A.

FIG. 10A is a side view and FIG. 10B is a bottom view of an alternative embodiment of a double acting blade assembly 902a, 902b usable with the trimmer 100 of FIG. 1. As with previous embodiments, the first blade 902a and the second blade 902b each include a tang 904a, 904b at a proximal end. The first blade 902a and the second blade 902b extend from respective tangs 904a, 904b toward respective cutting edges with a generally uniform width. As can be seen particularly in FIG. 10B, each of the blades 902a, 902b are bent or curved so that when the blades are assembled and a rivet 910 of the second blade 902b is fitted within a slot 908 of the first blade 902a, the tangs 904a, 904b of the blades are arrangeable on opposite sides of a motor that actuates one or both of the blades 902a, 902b.

As with the embodiment of FIGS. 8A-9B, a cutting edge of the first blade 902a begins with a partial tooth 920a. The partial tooth 920a can be dull or sharp, or one edge can be dull (the edge at a proximal end of the cutting edge) and the other edge can be sharp. As shown, the width of the first blade 902a is at a maximum along the first nine teeth 920a-936a from a proximal end of the cutting edge. The width of the first blade 902a is then reduced along the cutting edge at varying increments so that the next eight teeth 938a-952a have cutting surfaces that are receded relative to the teeth that are closer to the proximal end of the cutting edge. The teeth 920a-952a of the first blade 902a are longer and are spaced further from each other near the proximal end of the cutting edge, as compared with the embodiment of FIGS. 8A and 8B.

Still further, as with the previous embodiment, the orientation of at least eight of the teeth 938a-952a extending to the distal end is incrementally angled toward the distal end of the first blade relative to the preceding teeth. The incremental angling can be even or vary. The inventor has discovered that the incrementally angled teeth can be used to advantage in removing small portions of a plant while leaving the surrounding area untouched. The cutting edge of the second blade 902b, and the size, shape, rotation, and arrangement of the teeth 920b-952b of the second blade 902b are generally the same as the first blade 902a. However, when the proximal ends of the blades 902a, 902b are aligned, the teeth of the blades 902a, 902b are offset so that the teeth of one blade extend through gaps between the teeth of the other blade. Further, the distal end of the first blade 902a extends beyond the distal end of the second blade 902b, as can be seen more clearly in FIG. 10B. The inventor has discovered and appreciated that the point-to-point spacing of the teeth can vary, and a range of approximately 0.15 inches to 0.2 inches is generally well suited for precision manicuring of fully hydrated foliage.

Figure 11A:
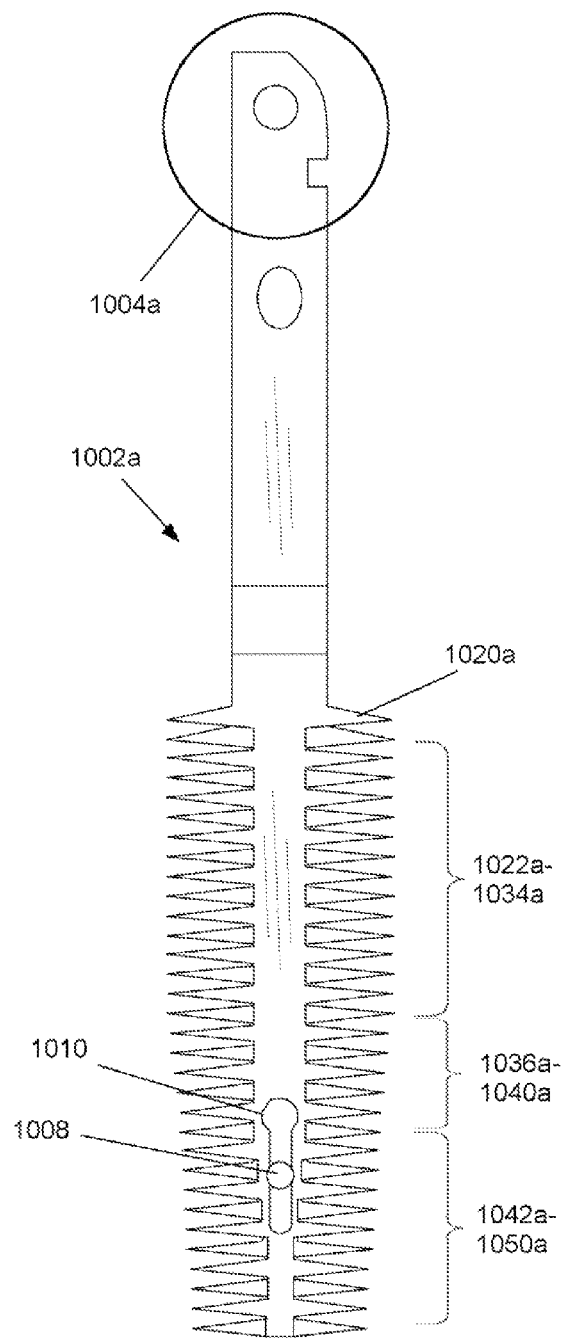
FIG. 11A is a side view of an alternative embodiment of a double acting blade assembly for use with embodiments of trimmers in accordance with the present invention.
Figure 11B:
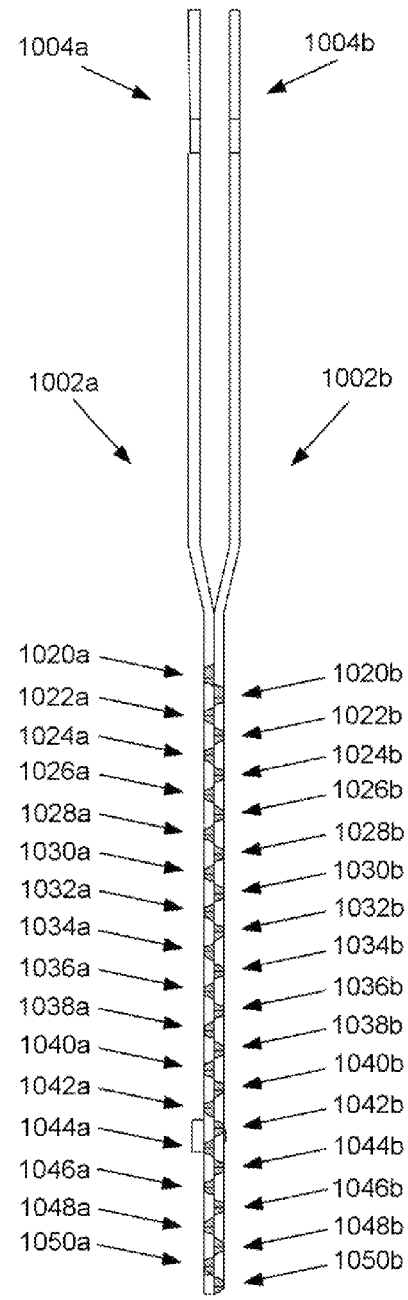
FIG. 11B is a bottom view of the embodiment of FIG. 11A.

FIG. 11A is a side view and FIG. 11B is a bottom view of an alternative embodiment of a double acting blade assembly 1002a, 1002b usable with the trimmer 100 of FIG. 1. As with previous embodiments, the first blade 1002a and the second blade 1002b each include a tang 1004a, 1004b at a proximal end. The first blade 1002a and the second blade 1002b extend from respective tangs 1004a, 1004b toward respective cutting edges with a generally uniform width. As can be seen particularly in FIG. 11B, each of the blades 1002a, 1002b are bent or curved so that when the blades are assembled and a rivet 1010 of the second blade 1002b is fitted within a slot 1008 of the first blade 1002a, the tangs 1004a, 1004b of the blades are arrangeable on opposite sides of a motor that actuates one or both of the blades 1002a, 1002b.

As with the embodiment of FIGS. 8A-10B, a first cutting edge of the first blade 1002a begins with a partial tooth 1020a. The partial tooth 1020a can be dull or sharp, or one edge can be dull (the edge at a proximal end of the cutting edge) and the other edge can be sharp. As shown, the width of the first blade 1002a is at a maximum along the first eight teeth 1020a-1034a from a proximal end of the first cutting edge. The width of the first blade 1002a is then reduced along the cutting edge by an incrementally reduced length of the teeth 1036a-1040a and then further reduced at varying increments as the next five teeth 1042a-1050a have cutting surfaces that are receded relative to the teeth that are closer to the proximal end of the cutting edge. The size and spacing of the teeth is approximately the same as the size and spacing of the embodiment of FIGS. 10A and 10B, and is likewise well suited to precision manicuring of fully hydrated foliage.

As shown, the first blade 1002a includes a second cutting edge that is opposite the first cutting edge and that includes a series of teeth that mirrors the first cutting edge. The first and second cutting edges of the second blade 1002b, and the size, shape, rotation, and arrangement of the teeth 1020b-1050b of the second blade 1002b are generally the same as the first blade 1002a. The distal ends of the first blade 1002a and the second blade 1002b are substantially aligned so that the first blade and the second blade are substantially the same length. However, when the proximal ends of the blades 1002a, 1002b are aligned, the teeth of the blades 1002a, 1002b are offset so that the teeth of one blade extend through gaps between the teeth of the other blade. The dual cutting edges allow for faster bulk trimming as it has dual sided action along with the stepwise tooth reduction allowing for some maneuverability in getting to narrow areas on a plant.

Figure 12A:
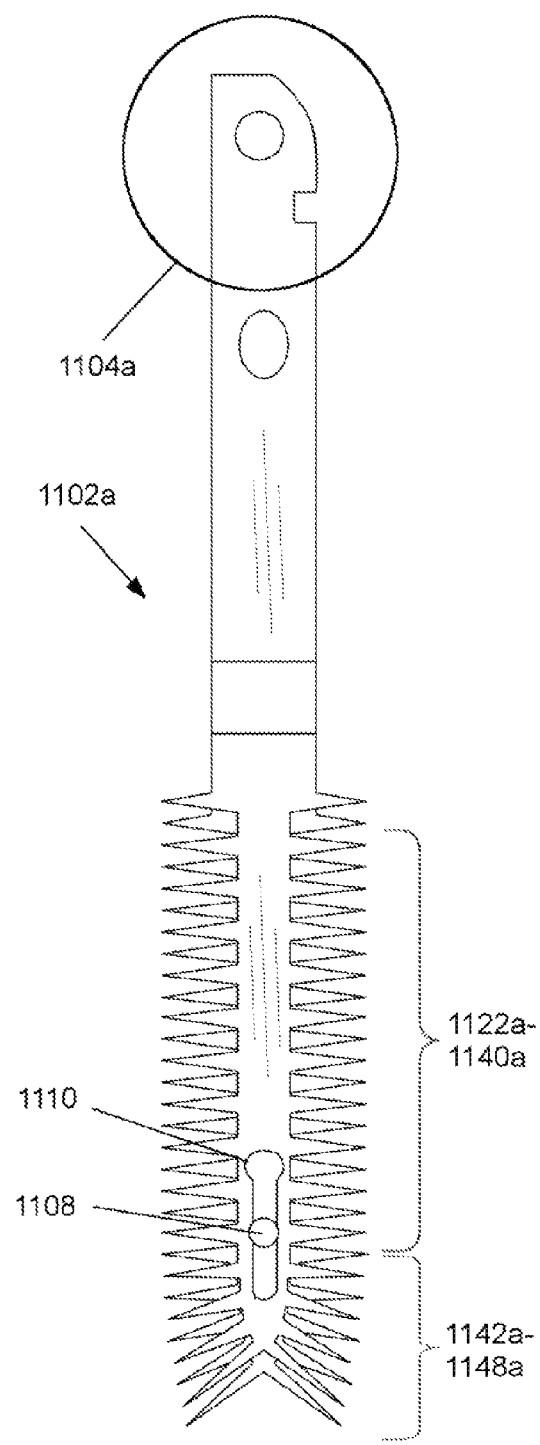
FIG. 12A is a side view of an alternative embodiment of a double acting blade assembly for use with embodiments of trimmers in accordance with the present invention.
Figure 12B:
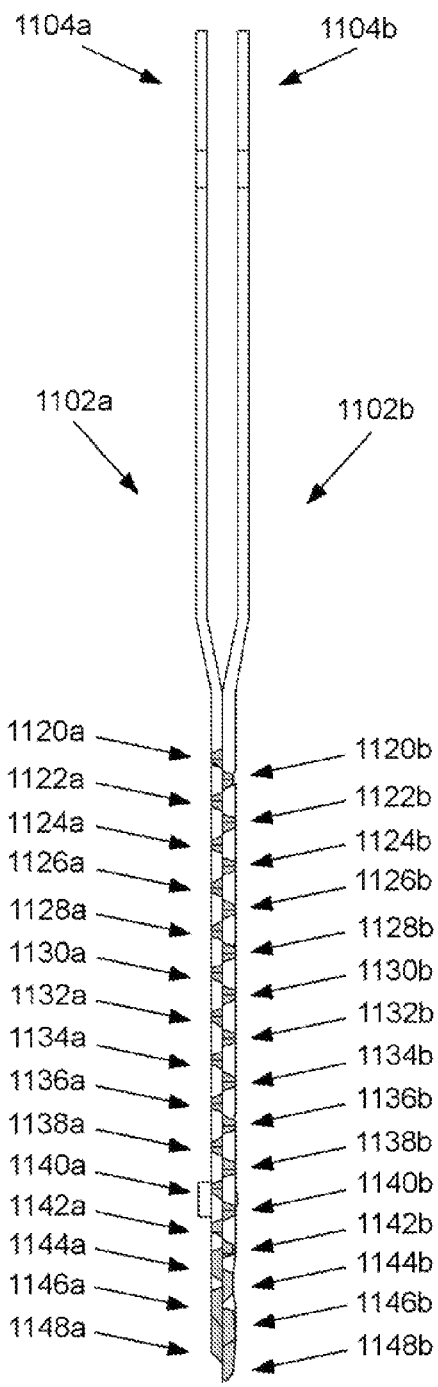
FIG. 12B is a bottom view of the embodiment of FIG. 12A.

FIG. 12A is a side view and FIG. 12B is a bottom view of an alternative embodiment of a double acting blade assembly 1102a, 1102b usable with the trimmer 100 of FIG. 1. As with previous embodiments, the first blade 1102a and the second blade 1102b each include a tang 1104a, 1104b at a proximal end. The first blade 1102a and the second blade 1102b extend from respective tangs 1104a, 1104b toward respective cutting edges with a generally uniform width. As can be seen particularly in FIG. 12B, each of the blades 1102a, 1102b are bent or curved so that when the blades are assembled and a rivet 1110 of the second blade 1102b is fitted within a slot 1108 of the first blade 1102a, the tangs 1104a, 1104b of the blades are arrangeable on opposite sides of a motor that actuates one or both of the blades 1102a, 1102b.

As with the embodiment of FIGS. 8A-11B, a first cutting edge of the first blade 1102a begins with a partial tooth 1120a. The partial tooth 1120a can be dull or sharp, or one edge can be dull (the edge at a proximal end of the cutting edge) and the other edge can be sharp. As shown, the width of the first blade 1102a is at a maximum along the first twelve teeth 1120a-1142a from a proximal end of the cutting edge. The size and spacing of the teeth is approximately the same as the size and spacing of the embodiment of FIG. 10A-11B, and is likewise well suited to precision manicuring of fully hydrated foliage.

The widths of the first blade 1102a is then reduced along the cutting edge as the orientation of at least four of the teeth 1142a-1148a extending to the distal end is incrementally angled toward the distal end of the first blade relative to the preceding teeth. The incremental angling can be even or vary. The inventor has discovered that the incrementally angled teeth can be used to advantage in removing small portions of a plant while leaving the surrounding area untouched. As shown, the first blade 1102a includes a second cutting edge that is opposite the first cutting edge and that includes a series of teeth that mirrors the first cutting edge. The first and second cutting edges of the second blade 1102b, and the size, shape, rotation, and arrangement of the teeth 1120b-1148b of the second blade 1102b are generally the same as the first blade 1102a. However, when the proximal ends of the blades 1102a, 1102b are aligned, the teeth of the blades 1102a, 1102b are offset so that the teeth of one blade extend through gaps between the teeth of the other blade. Further, the distal end of the first blade 1102a extends beyond the distal end of the second blade 1102b, as can be seen more clearly in FIG. 11B.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

The invention claimed is:

1. A pair of blades one or both of which is adapted to be reciprocated along a longitudinal axis, the pair of blades comprising:
a first blade having
a proximal end,
a distal end,
a length extending between the proximal end and the distal end, and
a cutting edge extending along a portion of the length to the distal end,
wherein the cutting edge includes a series of teeth, and
wherein a width of the first blade is stepwise reduced along the cutting edge to the distal end so that one or more teeth from the series of teeth has a cutting surface that is receded relative to a tooth from the series of teeth that is closer to the proximal end; and
a second blade having
a proximal end,
a distal end,
a length extending between the proximal end and the distal end,
a cutting edge extending along a portion of the length to the distal end,
wherein the cutting edge includes a series of teeth, and
wherein a width of the second blade is stepwise reduced along the cutting edge to the distal end so that one or more teeth from the series of teeth has a cutting surface that is receded relative to a tooth from the series of teeth that is closer to the proximal end.

2. The pair of blades of claim 1, wherein:
the one or more teeth of the series of teeth of the first blade are incrementally rotated in orientation so that the one or more teeth from the series of teeth has a cutting surface that is rotated in orientation toward the distal end of the first blade relative to a tooth from the series of teeth that is closer to the proximal end; and
the one or more teeth of the series of teeth of the second blade are incrementally rotated in orientation so that the one or more teeth from the series of teeth has a cutting surface that is rotated in orientation toward the distal end of the second blade relative to a tooth from the series of teeth that is closer to the proximal end.

3. The pair of blades of claim 1, wherein the teeth of the series of teeth of the first blade and the second blade are spaced apart so that bases of the teeth are gapped from one another.

4. The pair of blades of claim 3, wherein when the proximal ends of the first blade and the second blade are aligned, the teeth of the first blade are offset from the teeth of the second blade.

5. The pair of blades of claim 1, wherein the cutting edge of the first blade and the second blade is a first cutting edge, and the first blade and the second blade each includes a second cutting edge opposite the first cutting edge and mirroring the first cutting edge.

6. The pair of blades of claim 1, wherein a spacing of the series of teeth of the first blade and the second blade from a point of one tooth to a point of an adjacent tooth is between 0.06 inches and 0.12 inches.

7. The pair of blades of claim 1, wherein a spacing of the series of teeth of the first blade and the second blade from a point of one tooth to a point of an adjacent tooth is between 0.15 inches and 0.2 inches.

8. A pair of blades one or both of which is adapted to be reciprocated along a longitudinal axis, the pair of blades comprising:
a first blade having
a proximal end,
a distal end,
a length extending between the proximal end and the distal end, and
a cutting edge extending along a portion of the length to the distal end,
wherein the cutting edge includes a series of teeth,
wherein a width of the first blade is stepwise reduced along the cutting edge to the distal end so that one or more teeth from the series of teeth has a cutting surface that is receded relative to a tooth from the series of teeth that is closer to the proximal end, and
wherein the one or more teeth of the series of teeth of the first blade are incrementally rotated in orientation so that the one or more teeth from the series of teeth has a cutting surface that is rotated in orientation toward the distal end of the first blade relative to a tooth from the series of teeth that is closer to the proximal end; and
a second blade having
a proximal end,
a distal end,
a length extending between the proximal end and the distal end,
a cutting edge extending along a portion of the length to the distal end,
wherein the cutting edge includes a series of teeth,
wherein a width of the second blade is stepwise reduced along the cutting edge to the distal end so that one or more teeth from the series of teeth has a cutting surface that is receded relative to a tooth from the series of teeth that is closer to the proximal end, and
wherein the one or more teeth of the series of teeth of the second blade are incrementally rotated in orientation so that the one or more teeth from the series of teeth has a cutting surface that is rotated in orientation toward the distal end of the second blade relative to a tooth from the series of teeth that is closer to the proximal end.

9. The pair of blades of claim 8, wherein the teeth of the series of teeth of the first blade and the second blade are spaced apart so that bases of the teeth are gapped from one another.

10. The pair of blades of claim 9, wherein when the proximal ends of the first blade and the second blade are aligned, the teeth of the first blade are offset from the teeth of the second blade.

11. The pair of blades of claim 8, wherein the cutting edge of the first blade and the second blade is a first cutting edge, and the first blade and the second blade each includes a second cutting edge opposite the first cutting edge and mirroring the first cutting edge.

12. The pair of blades of claim 8, wherein a spacing of the series of teeth of the first blade and the second blade from a point of one tooth to a point of an adjacent tooth is between 0.06 inches and 0.12 inches.

13. The pair of blades of claim 8, wherein a spacing of the series of teeth of the first blade and the second blade from a point of one tooth to a point of an adjacent tooth is between 0.15 inches and 0.2 inches.

14. A pair of blades one or both of which is adapted to be reciprocated along a longitudinal axis, the pair of blades comprising:
a first blade having
a proximal end,
a distal end, a length extending between the proximal end and the distal end, and a first cutting edge extending along a portion of the length to the distal end, wherein the first cutting edge includes a series of teeth, and wherein a width of the first blade is stepwise reduced along the cutting edge to the distal end so that one or more teeth from the series of teeth has a cutting surface that is receded relative to a tooth from the series of teeth that is closer to the proximal end, and a second cutting edge mirroring the first cutting edge;

a second blade having a proximal end, a distal end, a length extending between the proximal end and the distal end, a first cutting edge extending along a portion of the length to the distal end, wherein the first cutting edge includes a series of teeth, and wherein a width of the second blade is stepwise reduced along the cutting edge to the distal end so that one or more teeth from the series of teeth has a cutting surface that is receded relative to a tooth from the series of teeth that is closer to the proximal end, and a second cutting edge mirroring the first cutting edge.

15. The pair of blades of claim 14, wherein:

the one or more teeth of the series of teeth of the first blade are incrementally rotated in orientation so that the one or more teeth from the series of teeth has a cutting surface that is rotated in orientation toward the distal end of the first blade relative to a tooth from the series of teeth that is closer to the proximal end; and the one or more teeth of the series of teeth of the second blade are incrementally rotated in orientation so that the one or more teeth from the series of teeth has a cutting surface that is rotated in orientation toward the distal end of the second blade relative to a tooth from the series of teeth that is closer to the proximal end.

16. The pair of blades of claim 14, wherein the teeth of the series of teeth of the first blade and the second blade are spaced apart so that bases of the teeth are gapped from one another.

17. The pair of blades of claim 16, wherein when the proximal ends of the first blade and the second blade are aligned, the teeth of the first blade are offset from the teeth of the second blade.

18. The pair of blades of claim 14, wherein the cutting edge of the first blade and the second blade is a first cutting edge, and the first blade and the second blade each includes a second cutting edge opposite the first cutting edge and mirroring the first cutting edge.

19. The pair of blades of claim 14, wherein a spacing of the series of teeth of the first blade and the second blade from a point of one tooth to a point of an adjacent tooth is between 0.06 inches and 0.12 inches.

20. The pair of blades of claim 14, wherein a spacing of the series of teeth of the first blade and the second blade from a point of one tooth to a point of an adjacent tooth is between 0.15 inches and 0.2 inches.

* * * * *